UNITED STATES PATENT OFFICE.

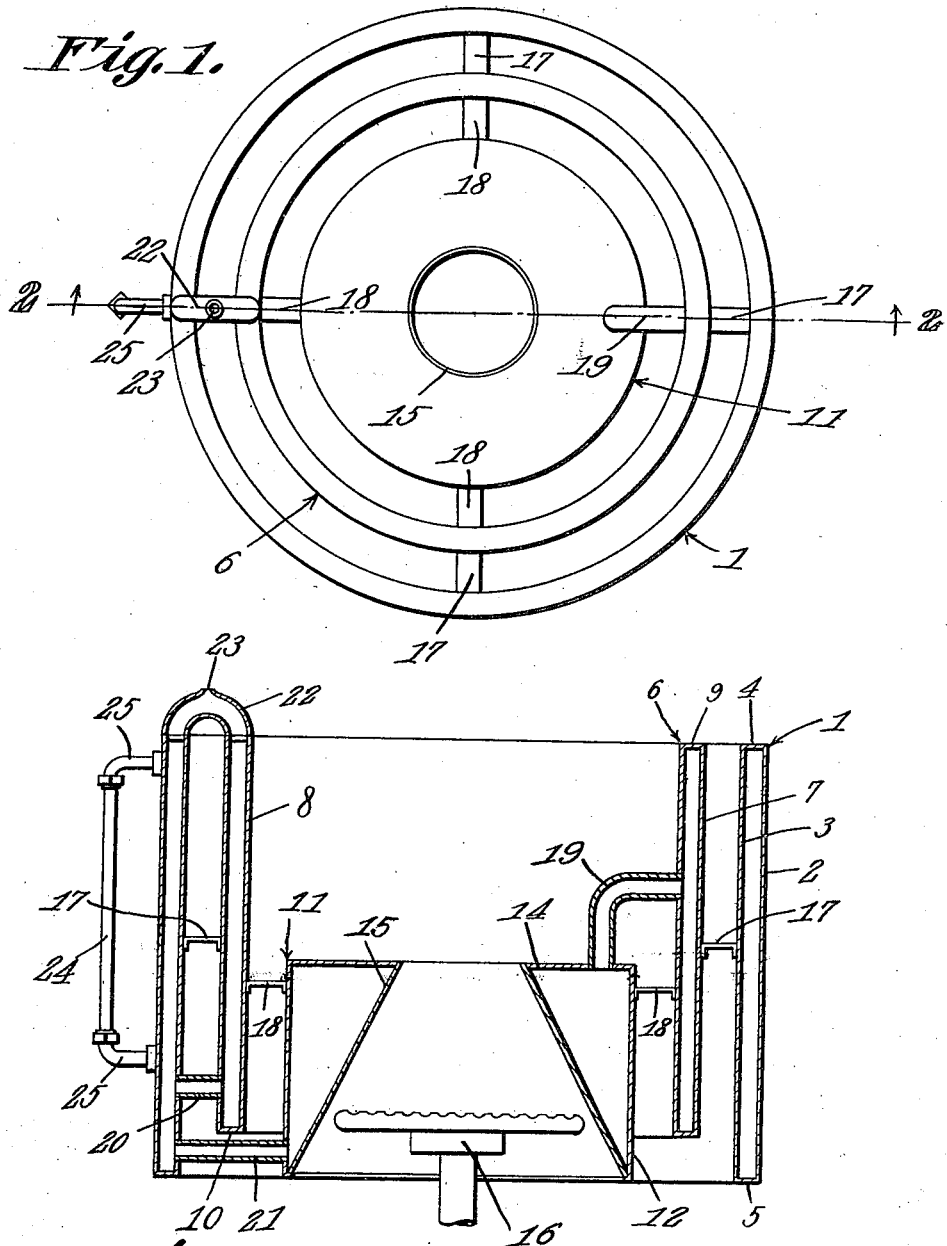

BENJOHN F. CRISENBERRY AND FRANK M. ANDRES, OF TIPTON, INDIANA.

HOT-WATER HEATER.

1,402,216. Specification of Letters Patent. Patented Jan. 3, 1922.

Application filed March 17, 1921. Serial No. 453,170.

*To all whom it may concern:*

Be it known that we, BENJOHN F. CRISENBERRY and FRANK M. ANDRES, citizens of the United States, residing at Tipton, in the county of Tipton, State of Indiana, have invented a new and useful Hot-Water Heater, of which the following is a specification.

The device forming the subject matter of this application is adapted to be employed for heating the air in a room, and, preferably, is of portable form, to the end that it may be carried about readily from place to place. The invention aims to provide a heater in which there will be but comparatively little pressure, the pressure being at a maximum, behind the water in the heater, and being at a minimum in advance of the water in the heater, as the water flows through the heater, the result being a rapid and thorough circulation, a large radiating area being afforded, and it being unnecessary to design the heater to withstand high pressure, comparatively light sheet metal being used, and a rapid radiation resulting.

It is within the province of the disclosure to improve generally and to enhance the utility of devices of that type to which the invention appertains.

Within the scope of what is claimed, a mechanic may make changes in the precise structure shown and described, without departing from the spirit of the invention.

In the drawings:—

Figure 1 shows in top plan, a device constructed in accordance with the invention; Figure 2 is a section taken approximately on the line 2—2 of Figure 1.

The device forming the subject matter of this application preferably is made of thin sheet metal and includes a cylindrical, double-walled, outer container 1, embodying an outer wall 2, an inner wall 3, a top 4 and a bottom 5.

Disposed within the outer container 1, and spaced therefrom, is an inner container 6, including an outer wall 7, an inner wall 8, a top 9 and a bottom 10. The top 9 of the inner container 6 may, if desired, be disposed in the same horizontal plane with the top 4 of the outer container 1, the bottom 10 of the inner container being spaced above the bottom 5 of the outer container.

Disposed within the inner container 6 is a drum 11, which may be made up of a cylindrical body 12, a top ring 14, and an inverted funnel-shaped flue 15 connecting the lower edge of the body 12 with the inner edge of the top ring 14, as shown in Figure 2.

A heating means 16 is located within the flue 15 of the drum and may be of any desired sort, depending upon the taste of the user. The device may be placed directly upon a stove, but, by way of illustration, the heating means has been shown in the form of a gas burner.

It may be expedient to connect the outer container 1 with the inner container 6 by brackets 17, and to connect the inner container to the drum 11 by brackets 18. The upper portion of the drum 11 discharges into the inner container 6 by way of a conduit 19, which may extend between the top ring 14 of the drum and the inner wall 8 of the inner container. The lower portion of the inner container 6 is connected with the lower portion of the outer container 1 by a pipe or conduit 20, disposed diametrically opposite to the conduit 19.

The conduit 20 is mounted at its ends in the inner wall 3 of the outer container 1 and in the outer wall 7 of the inner container 6. Communication is established between the outer container 1 and the lower portion of the drum 11, by way of a pipe or conduit 21 which may be alined vertically with the conduit 20. The conduit 21 extends beneath the lower edge of the inner container 6 and is mounted in the inner wall 3 of the outer container 1 and in the body 12 of the drum 11. In order to vent the outer container 1 and the inner container 6, thereby to facilitate the securing of a common water level in the containers, a U-shaped pipe 22 communicates with the outer container 1 and the inner container 6 and is mounted in the tops 4 and 9 of the members. The pipe 22 is supplied in its crown with a minute vent opening 23. The height of the water can be ascertained at any time, through the instrumentality of a gauge glass 24, connected at 25 to the outer wall 2 of the container 1.

In practical operation, the water, being heated in the drum 11, rises through the conduit 19 and passes into the inner container 6. The water circulates in the container 6, and as the water cools, the cooler portion of the water moves downwardly and enters the outer container 1, by way of the conduit 20. The water rises and circulates in the outer container 1, the water ultimately finding its way back into the drum 11, through the conduit 21, as the water cools in the outer container. The water is delivered, by the conduit 21, into the drum 11, at a point opposite to the conduit or pipe 19, and, consequently, the water circulates freely in the drum 11 and is heated therein to the desired temperature.

The general construction of the device is such that a large radiating surface is afforded. The flow of the water is impeded to a minimum extent and a high pressure never obtains. The device, therefore, may be made of light sheet metal, radiation being promoted, and the cost of manufacture being kept down.

Having thus described the invention, what is claimed is:—

1. In a device of the class described, an outer container; an inner container within the outer container; a drum within the inner container; a connection between the upper portion of the drum and the inner container; a connection between the lower portion of the drum and the outer container; a connection between the containers; and means for venting the containers.

2. In a device of the class described, a tubular outer container; a tubular inner container within the outer container and having its lower end spaced above the lower end of the outer container; a drum within the inner container and having its lower end substantially flush with the lower end of the outer container; a connection between the drum and the outer container and passing beneath the inner container; a connection between the containers; and a connection leading from the drum to the inner container.

3. In a device of the class described, a drum embodying an inverted conical flue; an inner container about the drum and spaced therefrom; an outer container about the inner container and spaced therefrom; a connection between the drum and the inner container; a connection between the containers; a connection between the outer container and the drum; and a connection communicating with the uppermost portions of the containers and provided with a vent.

In testimony that we claim the foregoing as our own, we have hereto affixed our signatures in the presence of two witnesses.

BENJOHN F. CRISENBERRY.
FRANK M. ANDRES.

Witnesses:
RAY H. YOUNG,
THOMAS B. BARTHOLOMEW.